Figure 1:
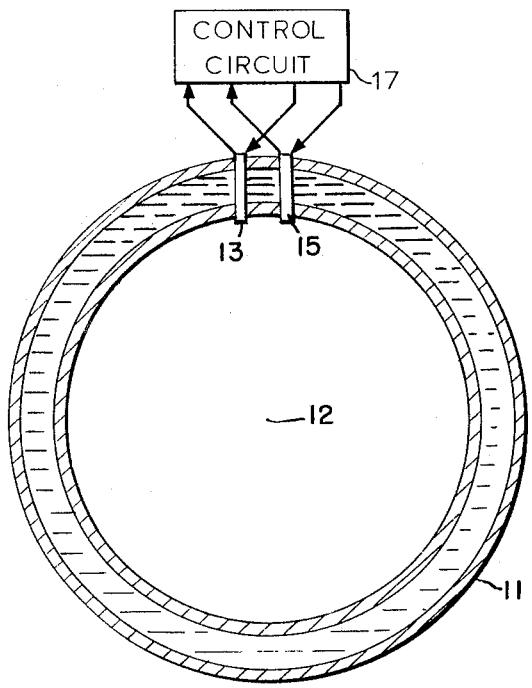

Dec. 27, 1966  H. E. RIORDAN ETAL  3,293,921
ANGULAR ACCELEROMETER
Filed Nov. 7, 1963  2 Sheets-Sheet 1

HUGH E. RIORDAN
JOHN C. STILES
*INVENTORS*

BY S.A. Giarratana
Francis L. Masselle
ATTORNEYS

HUGH E. RIORDAN
JOHN C. STILES
INVENTORS

3,293,921
ANGULAR ACCELEROMETER
Hugh E. Riordan, Wyckoff, and John C. Stiles, Morristown, N.J., assignors to General Precision Inc., Little Falls, N.J., a corporation of Delaware
Filed Nov. 7, 1963, Ser. No. 322,085
7 Claims. (Cl. 73—516)

This invention relates to angular accelerometers and more particularly to an angular accelerometer in which the angular acceleration is determined by sensing the angular movement of a liquid in a toroidal container by means of ultrasonic waves.

The relative velocity between the fluid in a toroidal container and the container is proportional to the angular acceleration of the toroidal container about its axis and the total angular movement of the liquid within a toroidal container relative to the toroidal container is proportional to the integral of the angular acceleration, or in other words to the angular velocity.

In the angular accelerometer of the present invention, an improved system for measuring the motion of a liquid in a toroidal container is provided. In accordance with the present invention, ultrasonic acoustical standing waves are generated in the fluid within the toroidal container and the standing waves are made to be fixed relative to the fluid. The motion of the fluid relative to the container can then be measured by measuring the motion of the standing wave relative to the container. A basic problem in making use of this concept was to generate the standing wave form in the fluid so that it is fixed relative to the fluid and not to the container. If an arbitrary oscillating driving force is applied to the fluid an antinode is enforced at the location of the driving transducer and accordingly the standing wave would be fixed relative to the transducer and not relative to the fluid. In the system of the present invention it is required that energy be supplied to the fluid to generate and support the standing waves without locking the wave pattern to the generating transducer.

Accordingly, a principal object of the present invention is to provide an improved angular accelerometer.

Another object of the present invention is to provide an improved angular accelerometer of the type in which angular acceleration is measured by measuring the motion of a fluid relative to a container.

A further object of the present invention is to provide an improved angular accelerometer in which the motion of fluid in a container is measured by means of compressional standing waves.

A still further object of the present invention is to provide a system for generating compressional standing waves in a fluid that moves relative to its container wherein the compressional standing waves are fixed relative to the fluid.

A still further object of the present invention is to provide an improved system for generating compressional standing waves in a fluid.

These objects are accomplished in accordance with the present invention by means of a toroidal container containing an electrically conducting liquid such as mercury. An ultrasonic standing waveform is generated in the liquid by means of transducers which cause currents to flow in the liquid perpendicular to applied magnetic fields. The standing wave that is generated is made to be fixed relative to the liquid rather than relative to the transducers by distributing the driving force provided by the transducers and properly controlling the phase of the distributed driving force. In accordance with the present invention, two transducers for applying an oscillating force to the liquid are spaced apart a distance equal to one-fourth of a wavelength or an integral multiple thereof of the standing wave to be generated in the liquid. Electrical signals are generated representing the instantaneous pressure as it varies in the liquid as a result of the ultrasonic standing waveform generated in the liquid. From these signals, additional signals are generated to be in phase with the velocity of the liquid as caused by the standing waveform at the positions of the transducers. These in phase signals are applied to the transducers to maintain the standing waveform. Because the standing waveform is maintained in this manner it is not locked to the transducers but moves with the liquid as the liquid moves relative to the toroidal container. The amplitudes of the applied signals are controlled so that the oscillating forces applied to the liquid have magnitudes to maintain a constant amplitude standing wave in the liquid. The motion of the standing wave relative to the toroidal container will represent the motion of the liquid relative to the toroidal container and accordingly from the standing wave the angular acceleration and angular velocity can be determined.

Figure 2:
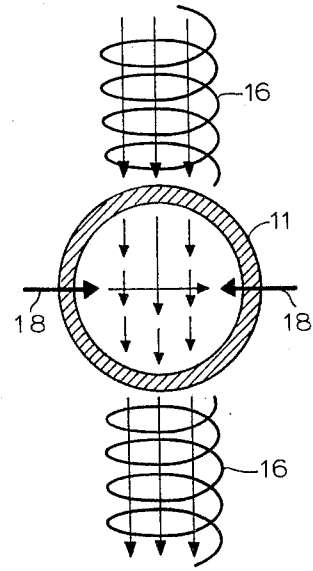
Figure 3:
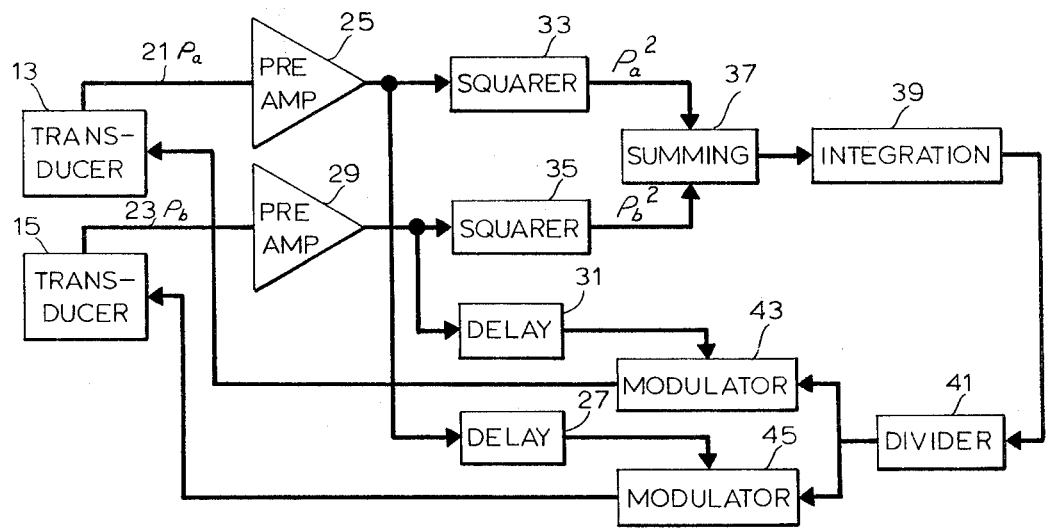
Figure 4:
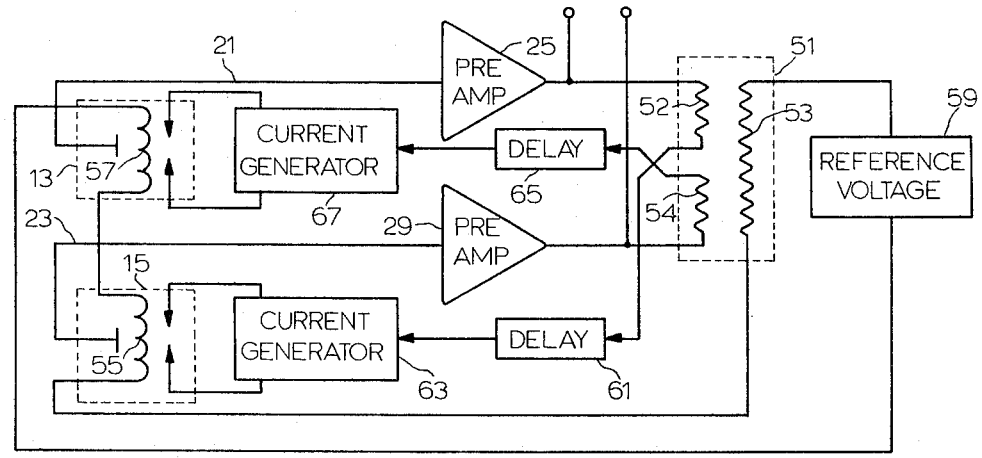
Figure 5:
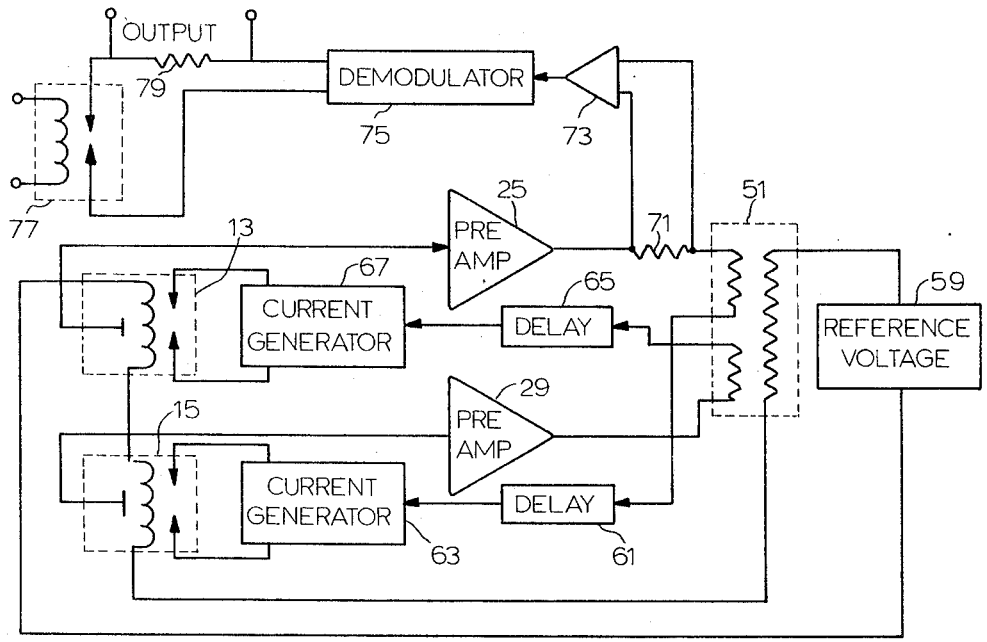

Further objects and advantages of the present invention will become readily apparent as the following detailed description of the invention unfolds and when taken in conjunction with the drawings, wherein:

FIG. 1 illustrates the angular accelerometer of the present invention;

FIG. 2 schematically illustrates how oscillating forces are applied to the liquid in the angular accelerometer; and FIGS. 3–5 illustrate systems for deriving signals to control the application of the oscillating forces to the liquid.

As shown in FIG. 1, the angular accelerometer of the present invention comprises a toroidal container 11 which is filled with a conducting liquid. In the preferred embodiment of the invention, the conducting liquid is mercury. At points angularly spaced about the axis 12 of the toroidal container transducer means 13 and 15 are provided for sensing the pressures and generating electrical signals representing the pressures at these two points and also for applying oscillating forces to the conducting liquid in a longitudinal direction in the container 11, or in other words tangentially relative to the axis 12 of the container 11. The transducer means 13 and 15 apply oscillating forces to the conducting liquid to generate a standing wave therein and the control circuit 17, in response to the pressures sensed by the transducer means 13 and 15 controls the phase and amplitude of the oscillating forces applied by the transducer means 13 and 15 so that the standing wave generated in the conducting liquid has a constant amplitude and is fixed relative to the conducting liquid even though the conducting liquid is moving relative to the container 11. The standing wave generated by the transducers 13 and 15 will extend throughout the toroidal container 11 and have nodes and antinodes angularly spaced about the axis 12.

The manner in which the transducer means 13 and 15 apply oscillating forces to the liquid in a tangential direction relative to the axis 12 is schematically illustrated in FIG. 2, which shows a sectional view through the container 11 perpendicular to the center line of the container 11. As shown in FIG. 2 a magnetic field is applied to the liquid in the container 11 by coils 16 or by a suitable permanent magnet and the field is applied perpendicular to the center line of the tube comprising the container 11. A pair of electrical probes 18 extend into the tube for conducting electrical current through the liquid in the tube. The probes are positioned so that the current will flow through the liquid in a direction perpendicular to the center line of the tube and perpendicular to the magnetic field applied by the coils 16. When both the magnetic field is applied to the liquid and the electric current is caused to flow through the liquid, a force will be generated and applied to the liquid perpendicular to both the magnetic field and the direction of current flow, or in other words in a direction parallel to the center line of the tube. The applied magnetic field is unipolar; that is, it does not change direction. The applied current, however, is an A.C. current so that the force applied to liquid is oscillatory, alternating in direction in phase with the A.C. current. By means of the oscillatory forces alternating in direction applied to the liquid in this manner by the transducers 13 and 15, the standing compressional wave is generated in the liquid in the container 11.

When the container 11 is angularly accelerated about the axis 12, the liquid in the container 11 will move longitudinally through the container 11. The velocity with which the liquid moves relative to the container 11 will be proportional to the angular acceleration and the distance that the liquid moves relative to the container 11 will be proportional to the angular velocity. The standing wave generated by the tranducers 13 and 15 fixed relative to the liquid is used to measure the motion of the liquid relative to the container and thereby provides an indication of the angular acceleration and the angular velocity of the container 11 about the axis 12.

When a compressional wave, or in other words a sound wave is generated in the liquid in the toroidal container 11 traveling longitudinally through the container 11, the distance $l$ that the wave travels relative to the container along its center line can be determined from the following equation:

(1) $$l = t(c+V)$$

in which $t$ is the time that the wave has traveled, $c$ is the velocity of sound in the liquid, and $V$ is the mean particle velocity that the liquid is moving relative to the container. The time $t$ can be also expressed as follows:

(2) $$t = t_0 - \Delta t$$

in which $t_0$ is the time that it would take the sound wave to travel the distance $l$ if the velocity $V$ of the liquid were zero; and $\Delta t$ is the change in the time that it takes a sound wave to travel the distance $l$ due to the velocity $V$ of the liquid. The time $t_0$ can be determined from the following equation:

(3) $$t_0 = l/c$$

Accordingly, from Equations 1, 2 and 3, the following equation results for the change in time $\Delta t$:

(4) $$\Delta t = t_0 - t = \frac{l}{c} - \frac{l}{c+V} = \frac{lV}{c^2+cV}$$

The velocity of sound $c$ will be much greater than the velocity $V$ so Equation 4 can be rewritten as follows:

(5) $$\Delta t = lV/c^2$$

The following equation can be written for the wave length $\lambda$ of the sound wave:

(6) $$\lambda = c/f = cT$$

in which $f$ is the frequency of the compressional wave and $T$ is the period of the compressional wave.

If $T_0$ represents the period of the compressional wave when the liquid is not moving in the container, $\lambda_0$ represents the wave length of the compressional wave when the liquid is not moving, $\Delta T$ represents the change in the period due to the motion of the liquid in the container, $\Delta \lambda$ represents the change in wave length due to motion of the liquid in the container, $f_0$ represents the frequency of the compressional wave when the liquid in the container is not moving, and $\Delta f$ represents the change in frequency of the compressional wave due to the motion of the liquid in the container, then from Equation 6 the following equations can be written:

(7) $$c(T_0 + \Delta T) = \lambda_0 + \Delta \lambda$$

(8) $$l(T_0 + \Delta T) = f_0 + \Delta f$$

(9) $$\Delta f = \frac{1}{T_0 + \Delta T} - f_0 = \frac{1 - f_0 T_0 - f_0 \Delta T}{T_0 + \Delta T}$$

since $f_0$ equals $1/T_0$, Equation 9 may be written as follows:

(10) $$\Delta f = \frac{-f_0 \Delta T}{T_0 + \Delta T}$$

The period $T_0$ will be much greater than $\Delta T$ so Equation 10 may be rewritten as follows:

(11) $$\Delta f = f_0^2 \Delta T$$

The quantity $\Delta \lambda$ can be expressed in the following equation:

(12) $$\Delta \lambda = V T_0$$

If Equation 7 is solved for $\Delta T$ and Equation 12 is substituted for $\Delta \lambda$ the following equation results:

(13) $$\Delta T = \frac{\lambda_0 + \Delta \lambda}{c} - T_0 = \frac{\lambda_0 + V T_0}{c} - T_0 = \frac{\lambda_0}{c} - T_0 + \frac{V T_0}{c}$$

Since the period $T_0$ equals the quantity $\lambda_0/c$, Equation 13 can be rewritten as follows:

(14) $$\Delta T = \frac{V T_0}{c} = \frac{V \lambda_0}{c^2}$$

If the formula of Equation 14 is substituted for $\Delta T$ in Equation 11, the following equation results:

(15) $$\Delta f = \frac{-f_0^2 V \lambda_0}{c^2}$$

Since the frequency $f_0$ equals the quantity $c/\lambda_0$, Equation 15 can be rewritten as follows:

(16) $$\Delta f = \frac{-c^2 V \lambda_0}{\lambda_0^2 c^2} = -\frac{V}{\lambda_0}$$

In the toroidal container 11 the velocity $V$ of the liquid relative to the container is proportional to the angular acceleration about the axis 12 and the relationship between the velocity and the angular acceleration is expressed in the following equation:

(17) $$V = \frac{Mr\ddot{\psi}}{A \Delta p/V}$$

in which $\psi$ is the angular acceleration about the axis 12, M is the total mass of the liquid in the container 11, $r$ is the radius between the center line of the container 11 and the axis 12, A is the cross-sectional area of the tube forming the toroidal container 11, and $\Delta p$ is the pressure drop around the toroid due to fluid friction. The mass M can be determined from the following equation:

(18) $$M = 2\pi r A \alpha$$

in which $\alpha$ is the mass density of the fluid. The quantity $\Delta p/V$ can be expressed in the following equation:

(19) $$\Delta p/V = \frac{32 \mu l_0}{d^2}$$

in which $\mu$ is the absolute viscosity of the liquid, $l_0$ is the circumference of the center line of the toroid, and $d$ is the diameter of the tube comprising the toroidal container 11. The area A can be determined by the following equation:

(20) $$A = \pi d^2/4$$

If the formulas of Equations 18, 19 and 20 are substituted for the quantities M, $\Delta p/V$ and A in Equation 17, the following equation results:

$$(21) \quad V = \frac{2\pi r^2 A \alpha \ddot{\psi}}{\left(\frac{\pi d^2}{4}\right) \frac{32\mu l_o}{a^2}} = \frac{r^2 A \alpha \ddot{\psi}}{4\mu l_o}$$

The circumference $l_o$ can be expressed as follows:

$$(22) \quad l_o = 2\pi r$$

Accordingly Equation 21 can be rewritten as follows:

$$(23) \quad V = \frac{rA\alpha\ddot{\psi}}{8\pi\mu}$$

The absolute viscosity $\mu$ of a fluid divided by its mass density is the kinematic viscosity $\nu$ of the fluid. Accordingly Equation 23 may be rewritten as follows:

$$(24) \quad V = \frac{rA\dot{\psi}}{8\pi\nu}$$

If the formula of Equation 24 is substituted for the velocity V in Equation 16, the following equation results:

$$(25) \quad \Delta f = \frac{rA\dot{\psi}}{8\pi\nu\lambda_o}$$

If both sides of Equation 25 are integrated with respect to time, the following equation will result:

$$(26) \quad n = \frac{rA\psi}{8\pi\nu\lambda_o}$$

in which $n$ is the integral of $\Delta f$ and $\psi$ is the angular velocity of the toroidal container 11 about the axis 12. If a standing wave is generated in the liquid in the toroidal container, then the change in frequency $\Delta f$ due to motion of the fluid will also be equal to the beat frequency at which the standing wave passes a point fixed on the container. Accordingly the integral $n$ of the beat frequency $\Delta f$ will equal the number of standing waves passing a fixed point on the toroidal container 11. Accordingly, Equation 26 gives the relationship between the number of standing waves passing a fixed point on the toroidal container 11 and the angular velocity of the container 11 about the axis 12. If the standing waves generated in the toroidal container have N wavelengths extending around the container, then the length $l_o$ will equal $N\lambda_o$. Accordingly the following equation can be written for the radius $r$:

$$(27) \quad r = \frac{l_o}{2\pi} = \frac{N\lambda_o}{2\pi}$$

When the formula of Equation 27 is substituted for $r$ in Equation 26, the following equation results:

$$(28) \quad n = \frac{NA\psi}{16\pi^2\nu}$$

Thus a count of the number of cycles of a standing wave passing a fixed point on the toroidal container 11 will be a direct measure of the angular velocity of the toroidal container 11 about the axis 12 and the beat frequency at which the standing waves pass the fixed point will represent the angular acceleration. The resolution of the representation of velocity and angular acceleration can be increased by detecting both when nodes and antinodes pass a fixed point. Further resolution can be obtained by interpolating between nodes and antinodes. This interpolation can be carried out easily since the standing wave will have a constant amplitude and will be sinusoidal.

When a compressional standing wave is generated in the toroidal container, the following equations can be written for the instantaneous pressure variation and instantaneous particle velocity V at two points $a$ and $b$ spaced a quarter of a wavelength apart:

$$(29) \quad \rho_a = \rho_{1a} \sin \omega t$$
$$(30) \quad \rho_b = \rho_{1b} \sin \omega t$$
$$(31) \quad v_a = v_{1a} \cos \omega t$$
$$(32) \quad v_b = v_{1b} \cos \omega t$$

in which $\rho_a$ is the instantaneous pressure variation due to the standing wave at the point $a$, $\rho_b$ is the instantaneous pressure variation due to the standing wave at point $b$, $v_a$ is the instantaneous particle velocity at point $a$, $v_b$ is the instantaneous particle velocity at point $b$, $\rho_{1a}$, $\rho_{1b}$, $v_{1a}$ and $v_{1b}$ are functions of the displacement of the standing wave from the position where a pressure node occurs at point $a$ and $\omega$ is the standing wave frequency. The functions $\rho_{1a}$, $\rho_{1b}$, $v_{1a}$ and $v_{1b}$ can be expressed as follows:

$$(33) \quad \rho_{1a} = \rho_o \sin \frac{2\pi}{\lambda_o} \Delta l$$

$$(34) \quad \rho_{1b} = \rho_o \cos \frac{2\pi}{\lambda_o} \Delta l$$

$$(35) \quad v_{1a} = -v_o \cos \frac{2\pi}{\lambda_o} \Delta l$$

$$(36) \quad v_{1b} = v_o \sin \frac{2\pi}{\lambda_o} \Delta l$$

in which $\rho_o$ is the maximum instantaneous pressure variation due to the standing wave, $v_o$ is the maximum particle velocity due to the standing wave and $\Delta l$ is the displacement of the standing wave from the position where a pressure node occurs at point $a$.

If the formulas of Equations 33 through 36 are substituted for $\rho_{1a}$, $\rho_{1b}$, $v_{1a}$ and $v_{1b}$ in Equations 29 through 32, the following equations result:

$$(37) \quad \rho_a = \rho_o \sin \frac{2\pi}{\lambda_o} \Delta l \sin \omega t$$

$$(38) \quad \rho_b = \rho_o \cos \frac{2\pi}{\lambda_o} \Delta l \sin \omega t$$

$$(39) \quad v_a = v_o \cos \frac{2\pi \Delta l}{\lambda_o} \cos \omega t$$

$$(40) \quad v_b = -v_o \sin \frac{2\pi \Delta l}{\lambda_o} \cos \omega t$$

The following equation may be written for the quantity $\cos \omega t$:

$$(41) \quad \cos \omega t = -\sin\left(\omega t - \frac{\pi}{2}\right) = -\sin \omega\left(t - \frac{\pi}{2\omega}\right)$$
$$= -\sin \omega\left(t - \frac{1}{4f_o}\right) = -\sin \omega\left(t - \frac{T_o}{4}\right)$$

If the formula for $\cos \omega t$ expressed in Equation 41 is substituted for $\cos \omega t$ in Equations 39 and 40, the following equations result:

$$(42) \quad v_a = -v_o \cos \frac{2\pi \Delta l}{\lambda_o} \sin \omega\left(t - \frac{T_o}{4}\right)$$

$$(43) \quad v_b = v_o \sin \frac{2\pi \Delta l}{\lambda_o} \sin \omega\left(t - \frac{T_o}{4}\right)$$

A comparison of Equations 42 and 43 with Equations 37 and 38 indicate that $\rho_a$ times $v_o/\rho_o$ delayed by one-fourth of a period may be substituted for $v_b$ and $\rho_b$ multiplied by $-v_o/\rho_o$ and delayed by one-fourth of a period may be substituted for $v_a$. The characteristic impedance $Z_o$ of a fluid in a tube is defined in terms of $v_o$ and $\rho_o$ as follows:

$$(44) \quad Z_o = \rho_o/v_o$$

If $\rho_o/Z_o$ is substituted for the quantity $v_o$ in Equations 42 and 43, the following equations result:

$$(45) \quad v_a = -\frac{1}{Z_o}\left[\rho_o \cos \frac{2\pi \Delta l}{\lambda_o} \sin \omega(t - T_o/4)\right]$$

$$(46) \quad v_b = \frac{1}{Z_o}\left[\rho_o \sin \frac{2\pi \Delta l}{\lambda_o} \sin \omega(t - T_o/4)\right]$$

A comparison of Equations 37 and 46 will indicate that if the function $\rho_a$ is delayed by one-fourth of the period $T_o$ and multiplied by $1/Z_o$, it will equal $v_b$. Likewise, a comparison of Equations 38 and 45 will indicate that if the function for $\rho_b$ is delayed by one-fourth of the period $T_o$ and multiplied times the quantity minus $1/Z_o$, it will equal the function for $v_a$. In other words, the following equations may be written for $v_a$ and $v_b$:

(47) $$v_a = -\frac{1}{Z_o}\rho_b(t - T_o/4)$$

(48) $$v_b = \frac{1}{Z_o}\rho_a(t - T_o/4)$$

Thus if the instantaneous pressure variation at point $b$ is delayed by one-fourth of the period and multiplied by the quantity minus the reciprocal of the characteristic impedance, it will equal the instantaneous velocity due to the standing wave at point $a$, and if the instantaneous pressure variation due to the standing wave at point $a$ is delayed by one-fourth of the period, and multiplied by the reciprocal of the characteristic impedance, it will equal the instantaneous velocity due to the standing wave at point $b$.

In order for a constant amplitude standing wave to be maintained, it is necessary that the power loss from the container equal the power put into the container by the transducers 13 and 15. Accordingly, the power put in by the transducer 15 to the standing wave plus the power put in by the transducer 13 to the standing wave must equal the power loss. The transducers 13 and 15 will be positioned at the points $a$ and $b$ on the container 11. If $F_a$ and $F_b$ are the driving forces applied by the transducers 13 and 15 to the liquid in the container 11 at points $a$ and $b$, then the power $P_a$ applied by the transducer 13 to the liquid in the container at point $a$ and the power $P_b$ applied by the transducer 15 to the liquid in the container at point $b$ are expressed in the following equations:

(49) $$P_a = F_a v_a$$
(50) $$P_b F_b = v_b$$

In order that the standing wave pattern generated by the transducers 13 and 15 be decoupled from the transducers 13 and 15, that is not fixed relative to these transducers but fixed relative to the liquid in the container 11, the forces $F_a$ and $F_b$ must be in phase with the velocities $v_a$ and $v_b$. Accordingly, the forces $F_a$ and $F_b$ may be expressed as follows:

(51) $$F_a = X_o v_a$$
(52) $$F_b = X_o v_b$$

in which $X_o$ is a D.C. value controlled in such a way that the power applied to the liquid to maintain the standing wave is equal to the power lost from the standing wave. If the power input is represented by $P_i$, it may be expressed as follows:

(53) $$P_i = P_a + P_b = F_a v_a + F_b v_b = X_o v_a^2 + X_o v_b^2$$

If the formulas of Equations 45 and 46 are substituted for $v_a$ and $v_b$ in Equation 53, the following equation results:

(54) $$P_i = \frac{X_o \rho_o^2}{Z_o^2}\left[\cos^2\frac{2\pi\Delta l}{\lambda_o} + \sin^2\frac{2\pi\Delta l}{\lambda_o}\right]\cos^2\omega t$$

Equation 54 can be simplified as follows:

(55) $$P_i = \frac{X_o \rho_o^2}{2Z_o^2}(1 + \cos 2\omega t)$$

The sinusoidally varying component of the input power will not have any effect on the amplitude of the standing wave since its average will be zero. Accordingly, if the quantity $X_o\rho_o^2/2Z_o^2$ is made equal to the power loss, the amplitude of the standing wave will remain constant. Thus if $P_d$ represents the power loss, which is assumed to be constant, then in order to maintain a constant amplitude standing wave, the following equation must be true:

(56) $$P_d = \frac{X_o \rho_o^2}{2Z_o^2}$$

Solving Equation 56 for $X_o$, the following equation results:

(57) $$X_o = \frac{2Z_o^2 P_d}{\rho_o^2}$$

$Z_o$ and $P_d$ are known constants and $\rho_o^2$ can be determined from the pressures $\rho_a$ and $\rho_b$. The relationship between $\rho_o^2$ and $\rho_a$ and $\rho_b$ can be determined by taking the sums of the squares of Equation 37 and 38. When this is done the following equation results:

(58) $$\rho_a^2 + \rho_b^2 = \rho_o^2 \sin^2 \omega t = \frac{\rho_o^2}{2}(1 + \sin 2\omega t)$$

If both sides of Equation 58 are averaged the following equation results:

(59) $$\frac{1}{t}\int(\rho_a^2 + \rho_b^2)dt = \frac{\rho_o^2}{2}$$

Accordingly the following equation can be written for $\rho_o^2$:

(60) $$\rho_o^2 = \frac{2}{t}\int(\rho_a^2 + \rho_b^2)dt$$

If the formula of Equation 60 is substituted for $\rho_o^2$ in Equation 58 the following equation results for $X_o$:

(61) $$X_o = \frac{Z_o^2 P d}{1/t \int(\rho_a^2 + \rho_b^2)dt}$$

Thus the value for $X_o$ can be determined from the instantaneous pressures at points $a$ and $b$. As pointed out above $v_a$ equals the pressure at point $b$ delayed by one-fourth of a period and multiplied by $-1/Z_o$ and $v_b$ equals the pressure at point $a$ delayed by one-fourth of a period multiplied by $1/Z_o$. Accordingly the quantity $X_o v_a$ and the quantity $X_o v_b$ may be determined entirely from the pressures at points $a$ and $b$ and the forces applied to the liquid at points $a$ and $b$ by transducers 13 and 15 may be made to equal these quantities and thereby maintain a constant amplitude standing wave in the liquid decoupled from the transducers 13 and 15.

FIG. 3 illustrates an electronic system for generating the electrical signals to be applied to the transducers 13 and 15 so as to satisfy Equations 51, 52 and 61 and thus cause the transducers 13 and 15 to generate a constant amplitude standing wave in the container 11 decoupled from the transducers 13 and 15. To generate this wave, the transducer 13 produces on an output channel 21 a signal representing the instantaneous pressure variation $\rho_a$ produced at point $a$ as a result of the standing wave. The transducer 15 produces on an output channel 23 a signal representing the instantaneous pressure variation $\rho_b$ produced at point $b$ as a result of the standing wave. This signal on channel 21 representing $\rho_a$ is amplified by a preamplifier 25 and then passed through a delay line 27 which introduces a delay of one-fourth of the period of the standing wave induced in the liquid in the container 11. The signal on channel 23 representing $\rho_b$ is amplified by a preamplifier 29 and then passed through a delay line 31 which also introduces a delay of one-fourth of the period of the standing wave. Since $v_b$ is proportional to $\rho_a$ delayed by one-fourth of the period of the standing wave and $v_a$ is proportional to $\rho_b$ delayed by one-fourth of the period of the standing wave, the output signal of the delay line 27 can be used to represent $v_b$ and the output signal of the delay line 31 can be used to represent $v_a$. The output signals of the amplifiers 25 and 29 are squared by squarers 33 and 35, respectively, to produce signals representing $\rho_a^2$ and $\rho_b^2$. These two signals are added together in a summing circuit 37 to produce an output signal representing $\rho_a^2 + \rho_b^2$. The output signal of summing circuit 37 is applied to integration circuit 39, which in response to the applied signal produces an output signal representing the quantity $$1/t \int (\rho_a^2 + \rho_b^2) dt$$

This output signal is applied to a divider 41 which generates an output signal proportional to the reciprocal of the signal applied from the integration circuit 39 and representing the quantity $$\frac{Z_o^2 P d}{1/t \int (\rho_a^2 + \rho_b^2) dt}$$

Accordingly, the output of the divider circuit 47 will represent $X_o$. The output signal of the divider circuit 41 representing $X_o$ will be a D.C. signal whereas the output signals of the delay lines 27 and 31 representing $v_b$ and $v_a$ will be sinusoidal signals. The output signal of the divider circuit 41 is applied to a pair of modulators 43 and 45. The modulator 43 also receives the output signal of the delay line 31 representing $v_a$ and modulates the signal applied from the divider circuit 41 with the signal applied from the delay line 31. Accordingly, the modulator 43 will produce an output signal representing $X_o v_a$ and therefore representing the force $F_a$ required to be applied by the transducer 13 in conjunction with the force $F_b$ to be applied by the transducer 15 to maintain a constant amplitude standing wave decoupled from the transducers 13 and 15. The modulator 45 also receives the output signal of the delay line 27 and modulates the signal applied from the divider circuit 41 with the output signal from the delay line 27. Accordingly, the modulator 45 will produce an output signal representing $X_o v_b$ and therefore representing the force $F_b$ required to be applied by the transducer 15 in conjunction with the force $F_a$ required to be applied by the transducer 13 to maintain the constant amplitude standing wave decoupled from the transducers 13 and 15. The output signal from the modulator 43 is applied to the transducer 13 to cause it to apply the force $F_a$ to the liquid in the container 11 and the output signal of the modulator 45 is applied to the transducer 15 to cause it to apply the force $F_b$ to the liquid in the container 11. In this manner forces of the proper magnitude and phase are applied to the liquid in the container 11 to maintain a constant amplitude standing compressional wave in the liquid decoupled from the transducers 13 and 15. The outputs from the preamplifiers 25 and 29 can be used to represent the motion of the standing wave and therefore the motion of the liquid in the container 11 relative to the container 11. Accordingly the outputs from the preamplifier can be used to provide signals representing angular velocity or angular acceleration.

If the forces $F_a$ and $F_b$ are applied to the liquid in the container 11 by passing currents through the liquid perpendicular to a magnetic field applied to the liquid, then the modulators can be dispensed with by using electromagnets rather than permanent magnets as the signal representing $X_o$ can be applied as a current through the field windings generating the magnetic field and the signals representing $v_a$ and $v_b$ can be applied as the perpendicular currents at points $a$ and $b$. FIG. 4 illustrates a system in which the forces $F_a$ and $F_b$ are generated in this manner. Also in FIG. 4 the squarers, the integration circuit and the divider circuit are combined into a single apparatus comprising a resistance bridge and designated by the reference number 51. The bridge 51 comprises three resistance elements 52, 53 and 54 insulated from each other but closely coupled thermally. The input resistance elements 52 and 54 are made from material having low thermal coefficient of resistivity. The output resistance element 53 is of a material having a high positive coefficient of resistivity. With this arrangement the output resistor 53 will have a resistance varying linearly with the time average of the sum of the squares of the currents flowing through the input resistors 52 and 54. As shown in FIG. 4 the output of the preamplifier 25 provides a heating current to the resistance element 52 proportional to $\rho_a$ and the output of the preamplifier 29 provides a heating current to the resistance element 54 proportional to $\rho_b$. As a result the resistor 53 will have a resistance varying linearly with the time average of the sum of the squares of $\rho_a$ and $\rho_b$. The resistance 53 is connected in series with coils 55 and 57 which are in the transducers 15 and 13 for applying the magnetic field to the liquid in the container. The series circuit of the resistor 53 in the coils 55 and 57 is connected across a source of reference voltage 59 so that a current flows through the coils 55 and 57 inversely proportional to the time average of the sum of the squares of $\rho_a$ and $\rho_b$ and representing the quantity $X_o$. Accordingly the coils 55 and 57 will apply magnetic fields at points $a$ and $b$ to the liquid in the container 11 corresponding to the value of $X_o$. The output of the preamplifier 25 after passing through the resistor 52 in the apparatus 51 passes through a delay line 61 to a current generator 63 and the output of the preamplifier 29 after passing through the resistor 54 in the apparatus 51 passes through a delay line 65 to a current generator 67. The delay lines 61 and 65 provide delays equal to one-fourth of the period $T_o$ of the standing wave so that the output of the delay line 65 can be used to represent $v_a$ and the output of the delay line 61 can be used to represent $v_b$. The current generator 63 produces a current corresponding to the applied signal, which current is conducted through the liquid at point $b$ perpendicular to the magnetic field applied by the coil 55. In this manner a force corresponding to $X_o v_b$ is applied to the liquid at point $b$. The current generator 67 produces an output current corresponding to the applied signal, which current is conducted through the liquid at point $a$ perpendicular to the magnetic field applied to the liquid by the coil 57. In this manner the force $F_a$ applied to the liquid at point $a$ is made to equal the quantity $X_o v_a$. Thus a standing wave will be generated in the liquid having a constant amplitude and decoupled from the transducers 13 and 15. As in the case of FIG. 3, the outputs from the preamplifiers 25 and 29 can be used to provide the output signals representing angular acceleration and velocity.

When the angular acceleration is high, the resulting large relative liquid velocities would cause serious smearing of the standing wave pattern. This effect can be eliminated by making use of a closed loop operation such as illustrated in FIG. 5. The circuit of FIG. 5 is the same as that of FIG. 4 except that the liquid in the container is captured against moving relative to the container 11. For this purpose the output of the preamplifier 25 is passed through a resistor 71 to produce a voltage proportional to $\rho_a$. This voltage is amplified by an amplifier 73 and then demodulated by a demodulator 75 which produces a D.C. current proportional to the maximum amplitude of $\rho_a$ and having a D.C. polarity corresponding to the A.C. polarity of $\rho_a$. This current is applied to a transducer 77 where it is caused to flow through the conducting liquid in the container 11 perpendicular to a constant magnetic field and perpendicular to the direction of fluid flow in the container 11. As a result, a force is applied to the liquid in the container 11 proportional to the maximum amplitude of $\rho_a$. The polarity of the output current of the demodulator 75 relative to the A.C. polarity of $\rho_a$ is selected so that the force applied by the transducer 77 will be in a direction to urge the fluid toward the position where a pressure node exists at point $a$ where the transducer 13 is located. In this manner the liquid in the container 11 is prevented from moving substantially relative to the container or in other words is captured against motion and the output signal of the demodulator 75 will be proportional to the angular acceleration of the container 11 about the axis 12. The output current of the demodulator 75 is conducted through a resistor 79 and the voltage drop across this resistor provides an output signal voltage representing the angular acceleration. Instead of spacing the transducers 13 and 15 one-fourth of a wavelength apart they may be spaced apart any spacing which satisfies the following formula:

(62) $\qquad S=(\frac{1}{2}N-\frac{1}{4})\lambda$ in which S is the spacing and N is any integer. The transducers 13 and 15 each actually comprise two transducers, one converting instantaneous pressure variation into an electrical signal and the other applying an oscillatory force to the liquid as explained with reference to FIG. 2. The pressure transducer of the transducer unit 13 does not have to be positioned at the same point as the oscillatory force generating transducer of the transducer unit 13 but may be spaced $\frac{1}{2}N$ wavelengths away, N being any integer. Similarly the pressure transducer of the transducer unit 15 can be spaced from the oscillatory force generating transducer of the transducer unit 15 by $\frac{1}{2}N$ wavelengths. Instead of being delayed by $\frac{1}{4}$ of a period, the output signals of the preamplifiers 25 and 29 could be delayed by any amount satisfying the following formula

(63) $\qquad D=(\frac{1}{2}N-\frac{1}{4})T_o$ in which D is the delay provided and N is any integer.

These and many other modifications may be made to the above described specific embodiments of the invention without departing from the spirit and scope of the invention, which is defined in the appended claims.

What is claimed is:

1. An angular accelerometer comprising:
   wall means defining a substantially unobstructed toroidal chamber;
   a body of electrically-conductive fluid filling said chamber;
   electromagnetic transducer means disposed and oriented so as to generate and maintain in said fluid a compressional standing wave having nodes and anti-nodes circumferentially spaced about said toroidal chamber; and
   means to detect movement of said standing wave relative to said wall means.

2. An angular accelerometer, according to claim 1, wherein said transducer means include at least two transducers spaced apart along said toroidal chamber by a distance equal to $(\frac{1}{2}N-\frac{1}{4})$ wavelength of said standing wave, N being any integer.

3. An angular accelerometer, according to claim 1, wherein said transducer means include means to apply a magnetic field to said fluid in a direction substantially perpendicular to the axis of the toroidal chamber and means to pass an alternating electric current through said fluid in said field in a direction substantially perpendicular to said field and parallel to said axis.

4. An angular accelerometer comprising a tubular toroid containing a substantially unobstructed interior, an electrically-conductive fluid in said toroid, transducer means to generate and maintain a compressional standing wave in said fluid having nodes and anti-nodes circumferentially spaced around said toroid, said transducer means comprising:
   means to apply to said fluid at a first point an oscillatory force at the frequency of said compressional standing wave and in phase with the instantaneous particle velocity due to said compressional standing wave,
   means to apply to said fluid at a second point spaced circumferentially from said first point an oscillatory force at the frequency of said compressional standing wave and in phase with the instantaneous particle velocity of the fluid due to the compressional standing wave so that said compressional standing wave is fixed relative to said fluid, and
   means to detect the movement of said standing wave relative to said toroid.

5. An angular accelerometer comprising a tubular toroid, fluid in said toroid, transducer means to generate and maintain a compressional standing wave in said fluid having nodes and anti-nodes circumferentially spaced about said toroid, said transducer means comprising:
   means to generate a first signal representing the pressure variation due to said compressional standing wave at a first point in said toroid,
   means to generate a second signal representing the pressure variation due to said compressional standing wave at a second point in said toroid spaced circumferentially from said first point along said toroid by a distance equal to $(\frac{1}{2}N-\frac{1}{4})\lambda$, N being any integer and $\lambda$ being the wavelength of the compressional standing wave;
   means to delay said first signal by an amount equal to $(\frac{1}{2}n-\frac{1}{4})T$, $n$ being any integer and T being the period of said compressional standing wave, to thereby produce a third signal;
   means to delay said second signal by an amount equal to $(\frac{1}{2}m-\frac{1}{4})T$, $m$ being any integer, to thereby produce a fourth signal;
   means responsive to said third signal to apply an oscillatory force to said fluid at the frequency of said third signal and in phase with the said third signal at a point spaced from said first point by a distance equal to $(\frac{1}{2}X-\frac{1}{4})\lambda$, X being any integer; and
   means to apply to said fluid an oscillatory force at the frequency of said fourth signal and in phase with said fourth signal at a point spaced from said second point by a distance equal to $(\frac{1}{2}Y-\frac{1}{4})\lambda$, Y being any integer.

6. An angular accelerometer comprising a tubular toroid, a fluid in said toroid, and transducer means to generate and maintain a compressional standing wave in said fluid having nodes and anti-nodes circumferentially spaced about said toroid, said transducer means comprising:
   means to generate a first signal representing the pressure variation due to said compressional standing wave at a first point in said toroid;
   means to generate a second signal representing the pressure variation due to said compressional standing wave at a second point in said toroid spaced circumferentially from said first point along said toroid by a distance equal to $(\frac{1}{2}N-\frac{1}{4})\lambda$, N being any integer and $\lambda$ being the wavelength of the compressional standing wave;
   means to delay said first signal by an amount equal to $(\frac{1}{2}n-\frac{1}{4})T$, $n$ being any integer and T being the period of said compressional standing wave, to thereby produce a third signal;
   means to delay said second signal by an amount equal to $(\frac{1}{2}m-\frac{1}{4})T$, $m$ being any integer, to thereby produce a fourth signal;
   means responsive to said first and second signals to produce a fifth signal varying in accordance with the reciprocal of the time average of the sum of the squares of said first and second signals;
   means to apply an oscillatory force to said fluid having an amplitude varying in accordance with said fifth signal and having a phase and frequency corresponding to said fourth signal at a point spaced from said second point by a distance equal to $(\frac{1}{2}Y-\frac{1}{4})\lambda$, Y being any integer; and
   means to apply an oscillatory force to said fluid having an amplitude varying in accordance with said fifth signal and having a phase and frequency corresponding to the phase and frequency of said third signal at a point spaced from said first point by an amount equal to ($\frac{1}{2}X - \frac{1}{4}$)λ, X being any integer.

7. An angular accelerometer as recited in claim 6 wherein means are provided responsive to said first signal to apply a force to said fluid in a direction to urge said fluid to a position where a pressure node occurs at said first point.

References Cited by the Examiner

UNITED STATES PATENTS

| | | | |
|---|---|---|---|
| 2,015,933 | 10/1935 | Hartig | 73—194 |
| 2,644,901 | 7/1953 | Hardway | 73—516 X |
| 2,826,912 | 3/1958 | Kirtz | 73—194 |
| 3,145,572 | 8/1964 | Brindley | 73—505 |

RICHARD C. QUEISSER, *Primary Examiner.*

J. J. GILL, *Assistant Examiner.*